(12) United States Patent
Richardson et al.

(10) Patent No.: US 9,219,917 B2
(45) Date of Patent: Dec. 22, 2015

(54) METHOD AND APPARATUS FOR REAL TIME PARALLEL ENCODING

(75) Inventors: John William Richardson, Crystal Lake, IL (US); Richard Edwin Goedeken, Somerset, NJ (US); Jens Cahnbley, Princeton Jct., NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 2652 days.

(21) Appl. No.: 11/795,417

(22) PCT Filed: Jan. 17, 2006

(86) PCT No.: PCT/US2006/001474
§ 371 (c)(1),
(2), (4) Date: Jul. 17, 2007

(87) PCT Pub. No.: WO2006/078594
PCT Pub. Date: Jul. 27, 2006

(65) Prior Publication Data
US 2008/0137736 A1    Jun. 12, 2008

Related U.S. Application Data

(60) Provisional application No. 60/645,179, filed on Jan. 19, 2005.

(51) Int. Cl.
*H04N 19/124* (2014.01)
*H04N 19/61* (2014.01)
(Continued)

(52) U.S. Cl.
CPC ........... *H04N 19/124* (2014.11); *H04N 19/127* (2014.11); *H04N 19/154* (2014.11);
(Continued)

(58) Field of Classification Search
CPC . H04N 19/124; H04N 19/127; H04N 19/154; H04N 19/174; H04N 19/177; H04N 19/42; H04N 19/436; H04N 19/61
USPC ............. 375/240.01, 240.03, 240.12, 240.24, 375/240.25
See application file for complete search history.

(56) References Cited

U.S. PATENT DOCUMENTS 5,793,425 A * 8/1998 Balakrishnan ........... 375/240.25
5,872,972 A * 2/1999 Boland et al. .................. 718/102
(Continued)

FOREIGN PATENT DOCUMENTS

EP    1509044       2/2005
WO   2006078594 A1  7/2006

OTHER PUBLICATIONS

Conklin, Gregory J., et al. "Video coding for streaming media delivery on the Internet." Circuits and Systems for Video Technology, IEEE Transactions on 11.3 (2001): 269-281.*

(Continued)

*Primary Examiner* — Kari Schmidt
(74) *Attorney, Agent, or Firm* — Palak Bhakta; Vincent E. Duffy

(57) ABSTRACT

There are provided apparatus and methods for parallelizing an encoding process across multiple processors. An apparatus includes a computing resource balancer and a splitter. The computing resource balancer is for assigning encoder instances to respective ones of the multiple processors based on at least one of thread affinity and process affinity. The splitter is for temporally dividing an incoming video sequence into discrete GOPs such that each of the encoder instances is capable of encoding the incoming video sequence in parallel so that each of the discrete GOPs is encoded on a respective one of the multiple processors.

12 Claims, 2 Drawing Sheets

(51) Int. Cl.
*H04N 19/127* (2014.01)
*H04N 19/154* (2014.01)
*H04N 19/177* (2014.01)
*H04N 19/174* (2014.01)
*H04N 19/42* (2014.01)
*H04N 19/436* (2014.01)

(52) U.S. Cl.
CPC .......... *H04N19/174* (2014.11); *H04N 19/177* (2014.11); *H04N 19/42* (2014.11); *H04N 19/436* (2014.11); *H04N 19/61* (2014.11)

(56) References Cited

U.S. PATENT DOCUMENTS

| | | | |
|---|---|---|---|
| 6,008,848 A | | 12/1999 | Tiwari et al. |
| 7,206,347 B2* | | 4/2007 | Lim et al. ................ 375/240.25 |
| 7,707,578 B1* | | 4/2010 | Zedlewski et al. ............ 718/102 |
| 2002/0172280 A1* | | 11/2002 | Ducloux et al. ......... 375/240.12 |
| 2003/0023982 A1* | | 1/2003 | Lee et al. ..................... 725/116 |
| 2003/0103564 A1* | | 6/2003 | Hanaki .................... 375/240.03 |
| 2004/0252768 A1 | | 12/2004 | Suzuki et al. |
| 2004/0258162 A1 | | 12/2004 | Gordon et al. |
| 2004/0264568 A1 | | 12/2004 | Florencio |
| 2005/0058207 A1* | | 3/2005 | Magee et al. ............ 375/240.26 |
| 2005/0062746 A1* | | 3/2005 | Kataoka et al. ............... 345/505 |
| 2005/0243922 A1* | | 11/2005 | Magee et al. ............ 375/240.12 |
| 2005/0262510 A1* | | 11/2005 | Parameswaran et al. ..... 718/105 |

OTHER PUBLICATIONS

Zimmermann, Roger, et al. "High resolution live streaming with the HYDRA architecture." Computers in Entertainment (CIE) 2.4 (2004): 16-16.*
Malaysian Search Report dated Jan. 28, 2009.
Dawson, Scott et al., "Optimal Parallel MPEG Encoding", Department of Computer Science, Cornell University, Ithaca, NY, http://www.cs.cornell,edu/Info/Projects/zeno/Projects/OPME/opme.report.html, Dec. 22, 2005, pp. 1-8.
Fernandez, J. C. et al.: "A Parallel Implementation of H.26L Video Encoder" vol. 2400, Aug. 27, 2002, pp. 830-833, XP008019627.
GE, Steven et al.: "Efficient Multithreading Implementation of H.264 Encoder on Intel Hyper-threading Architectures", vol. 1, Dec. 15, 2003, pp. 469-473, XP010701105.
Shen, Ke et al., "A Parallel Implementation of an MPEG1 Encoder. Faster Than Real-Time!", Purdue University and University of California, supported in part by the Advanced Research Projects Agency under contract DABT63-92-C-0022.
Tanenbaum, Andrew S.: "Modern Operating Systems" Second Edition 2001, Amsterdam, The Netherlands, Prentice Hall, NJ 07458, pp. 521-526, ISBN 0-13-031358-0.
The International Search Report, dated May 2, 2006.

* cited by examiner

METHOD AND APPARATUS FOR REAL TIME PARALLEL ENCODING

CROSS-REFERENCE TO RELATED APPLICATIONS

This application claims the benefit, under 35 U.S.C. §365 of International Application PCT/US2006/001474, filed Jan. 17, 2006, which was published in accordance with PCT Article 21(2) on Jul. 27, 2006 in English and which claims the benefit of U.S. provisional patent application No. 60/645,179, filed Jan. 19, 2005.

FIELD OF THE INVENTION

The present invention generally relates to video encoders and decoders and, more particularly, to a method and apparatus for real time parallel video encoding.

BACKGROUND OF THE INVENTION

The real-time encoding of video data is computationally VERY demanding and requires a significant amount of memory and computational resources.

Video encoding using parallel and distributed systems has been used in the past for MPEG-1 and MPEG-2 systems in several instances. One of the most notable cases is the Parallel Berkeley Encoder Project. The goal of this project was to accelerate the video encoding process by parallelizing video sequences in the temporal direction. The Parallel Berkeley Encoder Project utilizes a dynamic scheduling scheme that allocates a number of frames to each processor based on a complexity measurement. As imbalances are found in the complexity measurement and during encoding, new workload allocations are calculated for future sequences to be encoded.

However, video encoding using parallel and distributed systems is not without deficiency. Accordingly, it would be desirable and highly advantageous to have a method and apparatus for real time parallel video encoding that addresses a problem of scheduling temporal sequences of video for real-time encoding, for example with the JVT/H.264/MPEG-4 AVC ("JVT") standard, onto a parallel architecture such that encoding times are consistent. Moreover, it would be desirable and highly advantageous to have a method and apparatus for real time parallel video encoding that addresses another problem of maintaining accurate rate control with respect to multiple instances of parallel video encoders. Further, it would be desirable and highly advantageous to have a method and apparatus that addresses yet another problem of real-time encoding on a multi-processor PC platform.

SUMMARY OF THE INVENTION

These and other drawbacks and disadvantages of the prior art are addressed by the present invention, which is directed to a method and apparatus for real time parallel video encoding.

According to an aspect of the present invention, there is provided an apparatus for parallelizing an encoding process across multiple processors. The apparatus includes a computing resource balancer and a splitter. The computing resource balancer is for assigning encoder instances to respective ones of the multiple processors based on at least one of thread affinity and process affinity. The splitter is for temporally dividing an incoming video sequence into discrete Groups of Pictures (GOP)s such that each of the encoder instances is capable of encoding the incoming video sequence in parallel so that each of the discrete GOPs is encoded on a respective one of the multiple processors.

According to another aspect of the present invention, there is provided a method for parallelizing an encoding process across multiple processors. The method includes the step of assigning encoder instances to respective ones of the multiple processors based on at least one of thread affinity and process affinity. The method also includes the step of temporally dividing an incoming video sequence into discrete GOPs such that each of the encoder instances is capable of encoding the incoming video sequence in parallel so that each of the discrete GOPs is encoded on a respective one of the multiple processors.

According to yet another aspect of the present invention, there is provided an apparatus for parallelizing an encoding process across multiple processors. The apparatus includes a computing resource balancer and a splitter. The computing resource balancer is for assigning encoder instances to respective ones of the multiple computer processors based on at least one of thread affinity and process affinity. The splitter is for spatially dividing the incoming video sequence into discrete slices such that each of the encoder instances is capable of encoding the incoming video sequence in parallel so that each of the discrete slices is encoded on a respective one of the multiple processors.

According to still another aspect of the present invention, there is provided a method for parallelizing an encoding process across multiple processors. The method includes the step of assigning encoder instances to respective ones of the multiple processors based on at least one of thread affinity and process affinity. The method also includes the step of spatially dividing the incoming video sequence into discrete slices such that each of the encoder instances is capable of encoding the incoming video sequence in parallel so that each of the discrete slices is encoded on a respective one of the multiple processors.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
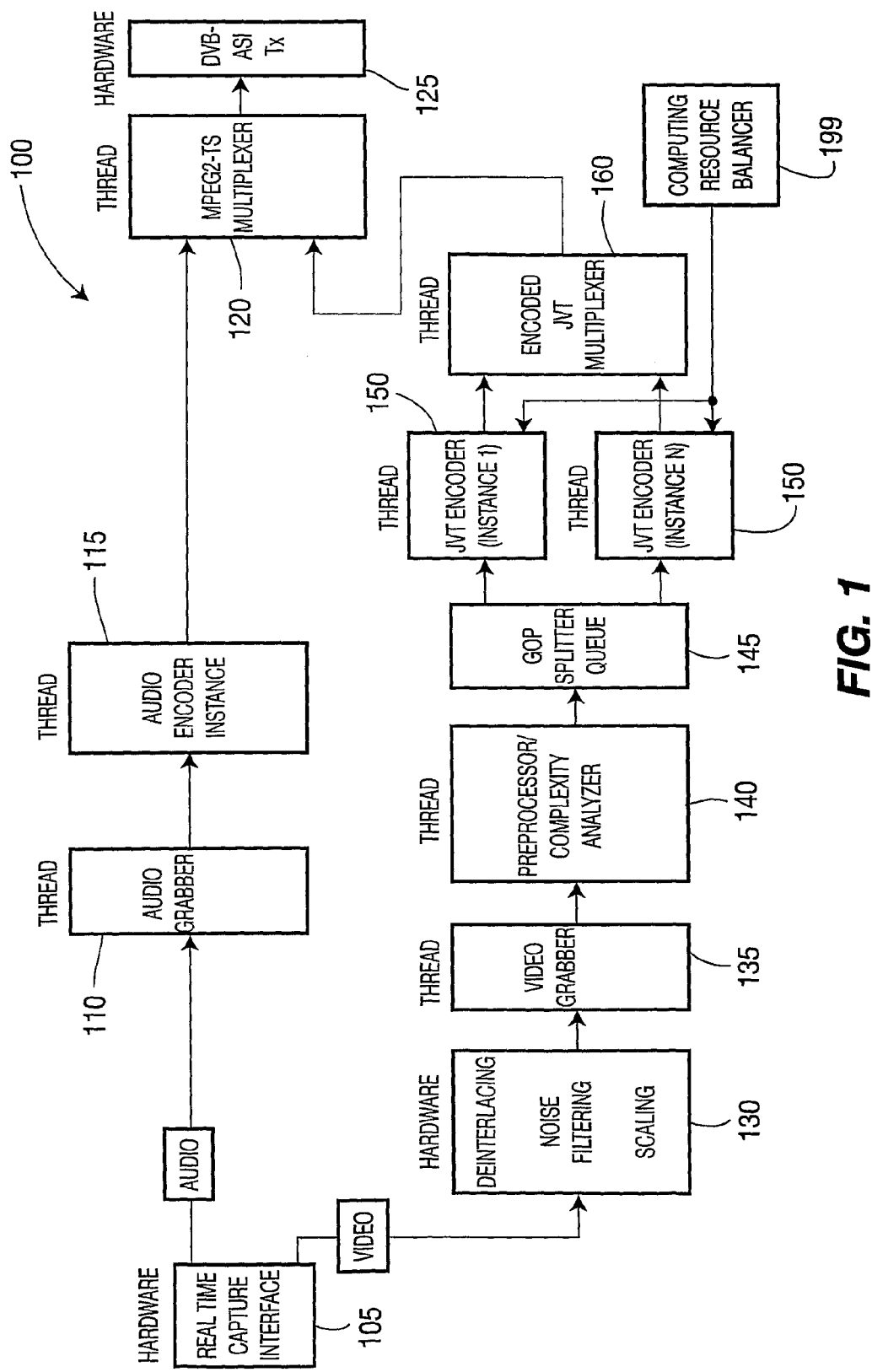
FIG. 1 shows a block diagram for a parallel video encoder architecture in a JVT/H.264/MPEG-4 AVC ("JVT") embodiment, in accordance with the principles of the present invention.

The present invention is directed to a method and apparatus for real time parallel video encoding. Advantageously, the present invention provides real-time video encoding using standard multi-processor desktop PCs, although the claims presented herein are not to be construed as being limited to the multi-processor desktop PC environment. Although the present invention is described in a JVT/H.264/MPEG-4 AVC ("JVT") standard video encoding environment, the principles of the present invention are also applicable for use with other video compression standards.

As noted above, real-time JVT encoding is computationally very demanding and requires a significant amount of memory and computational resources. Herein, a method and apparatus are provided that parallelize the JVT video encoding process across multiple processors on a temporal Group of Pictures (GOP) basis to achieve real-time encoding. The present invention combines techniques such as, e.g., picture complexity analysis and scene change detection in combination with multi-threaded software scheduling techniques.

Rather than focusing entirely on a performance metric for determining how parts of a video sequence are to be scheduled across processors, additional factors such as, e.g., scene change detection in addition to time windows, are used to schedule sequences. Additionally, in the parallel JVT encoder, each segment of the sequence to be encoded is independent of one other, which is not the case in the prior described Parallel Berkeley Encoder Project. In the Parallel Berkeley Encoder Project, there is some exchange of decoded reference frames between instances of the encoder that can create additional undesirable overhead. The use of independent sequences minimizes the interdependency of the data that is encoded in parallel resulting in only minimal communication between each encoder instance. Furthermore, it should also be mentioned that accurate bit rate control across encoder instances and scene change detection are not addressed in the Parallel Berkeley Encoder Project. Thus, while the present invention and the Parallel Berkeley Encoder Project relate to parallel video coding, the instant invention differs in many of the basic steps and approaches used to accomplish parallel encoding; including, but not limited to, how the sequences of pictures are scheduled across processors along with how rate control is accurately maintained.

Advantageously, the present invention addresses a problem of scheduling temporal sequences of video for real-time JVT encoding onto a parallel architecture such that encoding times are consistent. Moreover, the present invention advantageously addresses another problem of maintaining accurate rate control with respect to multiple instances of parallel JVT video encoders. Further, the present invention advantageously addresses yet another problem of real-time encoding on a multi-processor PC platform.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Advantageously, the present invention provides a novel approach for achieving real-time JVT encoding across multiple processors, for example—on standard multi-processor desktop PCs. Given the computationally intensive requirements for achieving real-time JVT encoding, a parallel architecture was deemed necessary to accomplish this goal. Even though there are several different approaches to parallelizing a video encoder such as, e.g., exploiting parallelism in the inner algorithms (i.e., motion estimation, mode decision, etc.), and encoding macroblocks in parallel, the approach of encoding sequences of pictures or GOPs in parallel was chosen because this method has more potential for scaling across multiple processors and also limits the changes that need to be made to the core architecture and functionality of an existing JVT encoder.

Turning to FIG. 1, a parallel video encoder architecture in a JVT/H.264/MPEG-4 AVC ("JVT") environment is indicated generally by the reference numeral 100.

The parallel video encoder architecture 100 includes a real time capture interface 105 having a first output connected in signal communication with an input of an audio grabber 110, and a second output connected in signal communication with an input of a deinterlacer/noise filter/scaler 130.

An output of the audio grabber 110 is connected in signal communication with an input of at least one instance of an audio encoder (hereinafter "audio encoder") 115. An output of the audio encoder 115 is connected in signal communication with a first input of an MPEG2-TS multiplexer 120. An output of the MPEG-2 transport stream (TS) multiplexer 120 is connected in signal communication with an input of a digital video broadcasting-asynchronous serial interface (DVB-ASI) transmitter (Tx) 125.

An output of the deinterlacer/noise filter/scaler 130 is connected in signal communication with an input of a video grabber 135. An output of the video grabber 135 is connected in signal communication with a preprocessor/complexity analyzer 140. An output of the preprocessor/complexity analyzer 140 is connected in signal communication with an input of a Group of Pictures (GOP) splitter queue (also referred to herein as a "scene change detector") 145. First through N outputs of the GOP splitter queue 145 are respectively connected in signal communication with inputs of first through N instances of a JVT encoder 150. Outputs of the first through N instances of the JVT encoder 150 are respectively connected in signal communication with first through N inputs of an encoded JVT multiplexer 160. An output of the encoded JVT multiplexer 160 is connected in signal communication with a second input of the MPEG-2 TS multiplexer 120.

The parallel video encoder architecture 100 further includes a computing resource balancer 199 that identifies system resources and allocates the resources such that thread and processor affinity assignments can take place (e.g., a single processor per encoder). The computing resource balancer 199 is connected in signal communication with at least the JVT encoder instances 150 or an element that creates/manages the JVT encoder instances 150. The computing resource balancer 199 may be part of a main application (not shown) that is basically in charge of setting up the entire data chain for the elements shown in FIG. 1, or may be a stand-alone element as shown in FIG. 1.

It is to be appreciated that while some of the elements shown in FIG. 1 are designated as hardware and others as software, it is to be appreciated that the present invention is not limited to the precise configuration shown in FIG. 1 and, thus, other configurations and implementations of such elements may also be employed given the teachings of the present invention provided herein, while maintaining the scope of the present invention. For example, in other embodiments of the present invention, elements shown in FIG. 1 as hardware elements may be implemented as software elements, elements shown in FIG. 1 as software elements may be implemented as hardware elements, and/or elements shown as one type (hardware or software) are implemented as a combination of hardware and software.

The flow of data in FIG. 1 moves from left to right, where the input data is represented as the video source and is in an uncompressed video format such as, but not limited to, YUV 420 and the output data is represented as, e.g., compressed JVT video NAL units. The real time capture interface 105 could be, e.g., either an analog capture interface or a digital video capture interface such as serial digital interface (SDI) or DV (IEEE 1394).

A further description will now be given regarding the deinterlacer/noise filter/scaler 130 shown in FIG. 1. De-interlacing, filtering and scaling are all important functional components of the encoder platform. To start with, in an analog capture system, the input video is usually in the format of interlaced Standard Definition (SD), namely 720×480i at 60 fields per second. However, the real-time H.264 encoder in accordance with the principles of the present invention preferably accepts progressive video at a maximum resolution of 352×288 or CIF at 30 frames per second and, therefore, a format conversion is performed. In addition to the de-interlacing conversion, noise filtering and scaling are also accomplished. The noise filtering removes noise in a spatial and/or temporal manner (i.e., Motion Compensated Temporal Filtering) in order to improve the quality of the video for encoding. Additionally, scaling is performed occur so that the input video is in the correct resolution for the encoder.

It should also be noted that in this particular H.264 encoder platform, the de-interlacing, filtering and scaling are all done in hardware. However, the present invention is not limited to such a configuration and, thus, these functions may also be performed in software or a combination of hardware and software.

A further description will now be given regarding the video grabber 135 shown in FIG. 1. The video grabber 135 is where the input video frames are captured from the input capture card at a constant rate. The video grabber 135 may be implemented as a high priority thread that captures the video frames into input buffers that are then passed to the encoder preprocessor for analysis.

A further description will now be given regarding the preprocessor/complexity analyzer 140 and the GOP splitter queue 145 shown in FIG. 1. The GOP splitter queue 145 provides the input sequence to each of the parallel encoder instances as shown in FIG. 1. A Group of Pictures (GOP) is defined to be a sequence of video frames to be encoded in a specific manner. For example, a half second GOP in a 30 frames per second video sequence could potentially be encoded as the following sequence of encoded frames: IBBPBBPBBPBBPBBP. Specifically, the first frame of each GOP presented to the preprocessor complexity analyzer 140 and encoder 150 is encoded as an instantaneous decoding refresh (IDR) synchronization frame, such that it is not dependent on any previously encoded pictures.

The preprocessor complexity analyzer 140 computes the complexity of each individual video frame with respect to the previous frame. In this stage, a 16×16 fast motion estimation is done for each macroblock. At least some of the following statistics are collected on a per macroblock basis and then stored for later use in the encoder for a period of at least three GOPs: horizontal motion vector; vertical motion vector; sum of absolute differences (SAD); and variance and standard deviation.

The above statistics are used to help more accurately achieve the desired rate control settings for the resulting encoded bitstream. The variance provides a good metric of image and encoding complexity, which results in a more optimal bit allocation on a frame-by-frame basis. Additionally, the statistics are also used to calculate where a scene change may occur in the bitstream, which then provides hints to the encoder on how to better encode the bitstream.

An estimated number of bits per picture will also be assigned in the preprocessor/complexity analyzer 140 in order to keep the rate control consistent with respect to encoded picture output quality and buffer constraints across the encoders.

A further description will now be given regarding the JVT encoder 150 shown in FIG. 1. After pre-processing, and once enough video data is available, each instance of the JVT encoder 150 will be presented with a GOP to encode. As the frames are encoded, the encoded frames will be inserted into a sorted linked-list at the multiplexer 160. It is likely that the frames could potentially arrive in an out-of-order sequence due to imbalances and non-ideal system conditions.

A further description will now be given regarding the encoded JVT multiplexer 160 shown in FIG. 1. The encoded JVT multiplexer 160 ensures the correct order of the encoder output frames and subsequently delivers the encoded JVT bitstream in sequence to a file or a transport interface. The most common transport interfaces are the DVB-ASI interface and Ethernet. The DVB-ASI interface is the standardized MPEG2 transport interface, while the Ethernet interface is the standard interface for Internet Protocol (IP) transport.

A description will now be given regarding rate control in accordance with the principles of the present invention. The objective of the rate control scheme in a dual processor encoder is to keep the output bitrate of each encoder instance consistent with respect to the intended bitrate. In addition, is also desirable to maintain consistent encoding quality between GOPs that are encoded by independent instances of the encoder. More specifically, it is visually undesirable to have large quality variations in the encoded video between each GOP. To limit the quality variations between GOPs, the quantization parameter (QP) must not greatly vary between the end of one GOP and the beginning of the next GOP. The preprocessor/complexity analyzer 140 helps to estimate the boundary conditions between GOPs such that the encoded QP difference between frames is minimized.

Figure 2:
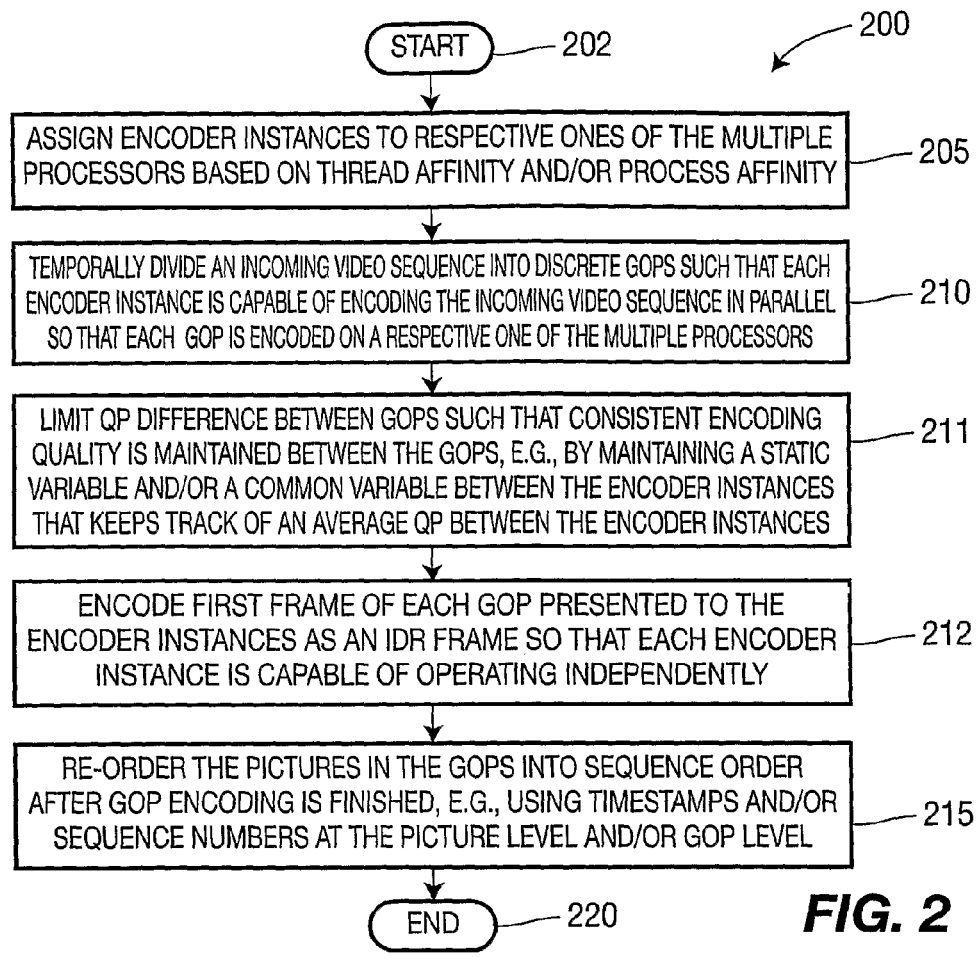
FIG. 2 shows a flow diagram for a method for parallel video encoding in a JVT/H.264/MPEG-4 AVC ("JVT") embodiment, in accordance with the principles of the present invention.

Turning to FIG. 2, a method for parallel video encoding in a JVT/H.264/MPEG-4 AVC ("JVT") environment is indicated generally by the reference numeral 200.

A start block 202 passes control to a function block 205. The function block 205 assigns encoder instances to respective ones of the multiple computer processors based on thread affinity and/or process affinity, and passes control to a function block 210. The function block 210 temporally divides an incoming video sequence into discrete GOPs such that each of the encoder instances is capable of encoding the incoming video sequence in parallel so that each of the discrete GOPs is encoded on a respective one of the multiple processors, and passes control to a function block 215.

The function block 210 also includes a function block 211 and a function block 212. The function block 211 that limits a quantization parameter (QP) difference between the discrete GOPs such that consistent encoding quality is maintained between the discrete GOPs, e.g., by maintaining a static global variable and/or a common variable between the encoder instances that keeps track of an average QP between the encoder instances. The function block 212 encodes the first frame of each of the discrete GOPs presented to the encoder instances as an IDR frame so that each of the encoder instances is capable of operating independently with respect to each other.

The function block 215 re-orders the pictures in the discrete GOPs into sequence order after GOP encoding is finished, e.g., using timestamps and/or sequence numbers at the picture level and/or the GOP level, and passes control to an end block 220.

Figure 3:
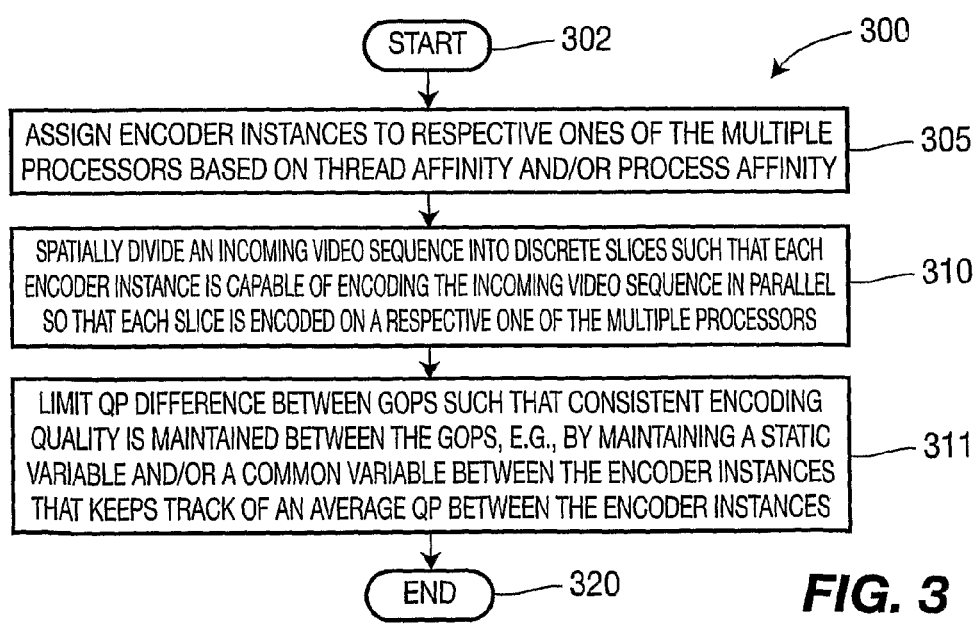
FIG. 3 shows a flow diagram for another method for parallel video encoding in a JVT/H.264/MPEG-4 AVC ("JVT") embodiment, in accordance with the principles of the present invention.

Turning to FIG. 3, another method for parallel video encoding in a JVT/H.264/MPEG-4 AVC ("JVT") environment is indicated generally by the reference numeral 300.

A start block 302 passes control to a function block 305. The function block 305 assigns encoder instances to respective ones of the multiple computer processors based on thread affinity and/or process affinity, and passes control to a function block 310. The function block 310 spatially divides an incoming video sequence into discrete slices such that each of the encoder instances is capable of encoding the incoming video sequence in parallel so that each of the discrete slices is encoded on a respective one of the multiple processors, and passes control to an end block 320.

The function block 310 also includes a function block 311. The function block 311 limits a quantization parameter (QP) difference between the discrete GOPs such that consistent encoding quality is maintained between the discrete GOPs, e.g., by maintaining a static global variable and/or a common variable between the encoder instances that keeps track of an average QP between the encoder instances.

A description will now be given of some of the many attendant advantages/features of the present invention. For example, one advantage/feature is an apparatus for parallelizing an H.264 encoding process across multiple computer processors, wherein the apparatus includes a computing resource balancer for assigning encoder instances to respective ones of the multiple computer processors based on thread and/or process affinity, and a splitter for dividing incoming video sequence into discrete GOPs or discrete slices such that each encoder instance can encode the incoming video sequence in parallel. The discrete GOPs or discrete slices are encoded such that one GOP or slice is encoded on one of the multiple computer processors, another GOP or slice is encoded on another one of the multiple computer processors, and so forth. Moreover, another advantages/feature is the apparatus as described above, wherein the quantization parameter (QP) difference between the GOPs or slices is limited such that consistent encoding quality is maintaining between the GOPs or slices. The QP difference may be maintained by, e.g., a static global variable (or a common variable between the two encoder threads) that keeps track of the average QP between the encoder instances. Further, another advantage/feature is the apparatus as described above, wherein pictures are re-ordered into sequence order after GOP encoding is finished. The re-ordering may be performed, e.g., by using timestamps and/or sequence numbers at the picture and/or GOP level. Also, another advantage/feature is the encoder as described above, wherein the first frame of each of the discrete GOPs respectively presented to the encoder instances is encoded as an IDR frame. By encoding the initial frame of each GOP as an IDR frame, the two instances of the encoder are able to operate independently These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for parallelizing a video encoding process across multiple computer hardware processors, comprising:
   a resource balancer for assigning encoder instances to respective ones of the multiple computer hardware processors based on process affinity;
   a splitter for temporally dividing an incoming video sequence into discrete group of pictures (GOPs) such that each of the encoder instances encodes the incoming video sequence in parallel so that each of the discrete GOPs is encoded on a respective one of the multiple hardware computer processors; and
   a multiplexer that re-orders pictures in the discrete GOPs into sequence order after GOP encoding is finished, wherein said multiplexer reorders the pictures using at least one of timestamps and sequence numbers for at least one of a picture level and a GOP level.

2. The apparatus according to claim 1, further comprising a complexity analyzer that limits a quantization parameter (OP) difference between the discrete GOPs such that consistent encoding quality is maintained between the discrete GOPs.

3. The apparatus according to claim 2, wherein said limiting limits the QP difference by maintaining at least one of a static global variable and a common variable between the encoder instances that keeps track of an average QP between the encoder instances.

4. The apparatus according to claim 1, wherein a first frame of each of the discrete GOPs presented to the encoder instances is encoded as an instantaneous decoding refresh frame, so that each of the encoder instances is capable of operating independently with respect to each other.

5. The apparatus according to claim 1, wherein the splitter temporally divides the incoming video sequence into the discrete GOPs for parallel encoding by the respective ones of the multiple computer hardware processors by detecting scene changes in the incoming video sequence.

6. A method for parallelizing a video encoding process across multiple computer hardware processors, comprising:
   assigning encoder instances to respective ones of the multiple computer hardware processors based on process affinity;
   temporally dividing an incoming video sequence into discrete group of pictures (GOPs) such that each of the encoder instances encodes the incoming video sequence in parallel so that each of the discrete GOPs is encoded on a respective one of the multiple computer hardware processors; and
   re-ordering pictures in the discrete GOPs into sequence order after GOP encoding is finished, wherein said re-ordering reorders the pictures using at least one of timestamps and sequence numbers for at least one of a picture level and a GOP level.

7. The method according to claim 6, further comprising limiting a quantization parameter (OP) difference between the discrete GOPs such that consistent encoding quality is maintained between the discrete GOPs.

8. The method according to claim 7, wherein said limiting limits the QP difference by maintaining at least one of a static global variable and a common variable between the encoder instances that keeps track of an average QP between the encoder instances.

9. The method according to claim 6, wherein a first frame of each of the discrete GOPs presented to the encoder instances is encoded as an instantaneous decoding refresh frame, so that each of the encoder instances is capable of operating independently with respect to each other.

10. The method according to claim 6, wherein said dividing temporally divides the incoming video sequence into the discrete GOPs for parallel encoding by the respective ones of the multiple computer hardware processors by detecting scene changes in the incoming video sequence.

11. An apparatus for parallelizing a video encoding process across multiple computer hardware processors, comprising:
   a computing resource balancer for assigning encoder instances to respective ones of the multiple computer hardware processors based on process affinity;
   a splitter for spatially dividing the incoming video sequence into discrete slices such that each of the encoder instances encodes the incoming video sequence in parallel so that each of the discrete slices is encoded on a respective one of the multiple computer hardware processors; and
   a complexity analyzer that limits a quantization parameter (OP) difference between the discrete slices such that consistent encoding quality is maintained between the discrete slices, wherein said limiting limits the OP difference by maintaining at least one of a static global variable and a common variable between the encoder instances that keeps track of an average OP between the encoder instances.

12. A method for parallelizing a video encoding process across multiple computer hardware processors, comprising:
   assigning encoder instances to respective ones of the multiple computer hardware processors based on process affinity;
   spatially dividing the incoming video sequence into discrete slices such that each of the encoder instances encodes the incoming video sequence in parallel so that each of the discrete slices is encoded on a respective one of the multiple computer hardware processors; and
   limiting a quantization parameter (OP) difference between the discrete slices such that consistent encoding quality is maintained between the discrete slices, wherein said limiting limits the OP difference by maintaining at least one of a static global variable and a common variable between the encoder instances that keeps track of an average OP between the encoder instances.

* * * * *